(12) United States Patent
Kang

(10) Patent No.: US 12,221,045 B2
(45) Date of Patent: Feb. 11, 2025

(54) DEVICE FOR RESTRAINING PASSENGER IN RELAXED POSITION FOR VEHICLE SEAT AND METHOD FOR CONTROLLING OPERATION THEREOF

(71) Applicants: Hyundai Motor Company, Seoul (KR); Kia Corporation, Seoul (KR)

(72) Inventor: Seung Kyu Kang, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 375 days.

(21) Appl. No.: 17/701,142

(22) Filed: Mar. 22, 2022

(65) Prior Publication Data

US 2022/0410832 A1    Dec. 29, 2022

(30) Foreign Application Priority Data

Jun. 24, 2021 (KR) .................. 10-2021-0082640

(51) Int. Cl.
| | |
|---|---|
| A63G 1/00 | (2006.01) |
| B60N 2/42 | (2006.01) |
| B60N 2/427 | (2006.01) |
| B60R 21/01 | (2006.01) |
| B60R 21/02 | (2006.01) |
| B60R 21/207 | (2006.01) |
| B60R 21/237 | (2006.01) |
| B60R 22/00 | (2006.01) |

(52) U.S. Cl.
CPC .............. *B60R 21/02* (2013.01); *B60R 21/01* (2013.01); *B60R 2021/022* (2013.01)

(58) Field of Classification Search
None
See application file for complete search history.

(56) References Cited

U.S. PATENT DOCUMENTS

| | | | | |
|---|---|---|---|---|
| 8,449,038 | B2* | 5/2013 | Flanigan | B60N 2/4279 |
| | | | | 297/487 |
| 2019/0308111 | A1* | 10/2019 | Vance | A63G 7/00 |
| 2019/0389414 | A1* | 12/2019 | Masuda | B60R 21/207 |

FOREIGN PATENT DOCUMENTS

KR    2019-0133688 A    12/2019

* cited by examiner

*Primary Examiner* — Jonathan M Dager
*Assistant Examiner* — Laura E Linhardt
(74) *Attorney, Agent, or Firm* — Fox Rothschild LLP

(57) ABSTRACT

A device for restraining a passenger in a relaxed position for a vehicle seat and a method for controlling the device are configured such that when a seated passenger in an autonomous vehicle enters a relaxed mode, and thus is seated in a relaxed posture in the vehicle seat, and when a vehicle speed is greater than or equal to a predetermined speed, the device automatically operates such that legs of the seated passenger can be restrained, thereby effectively protecting the passenger in the relaxed position if an accident occurs. The device includes a rod member coupled to a seat cushion and configured to have a variable length; and a support foam connected to one end of the rod member and positioned in front of the seated passenger to restrain the legs of the seated passenger.

19 Claims, 17 Drawing Sheets

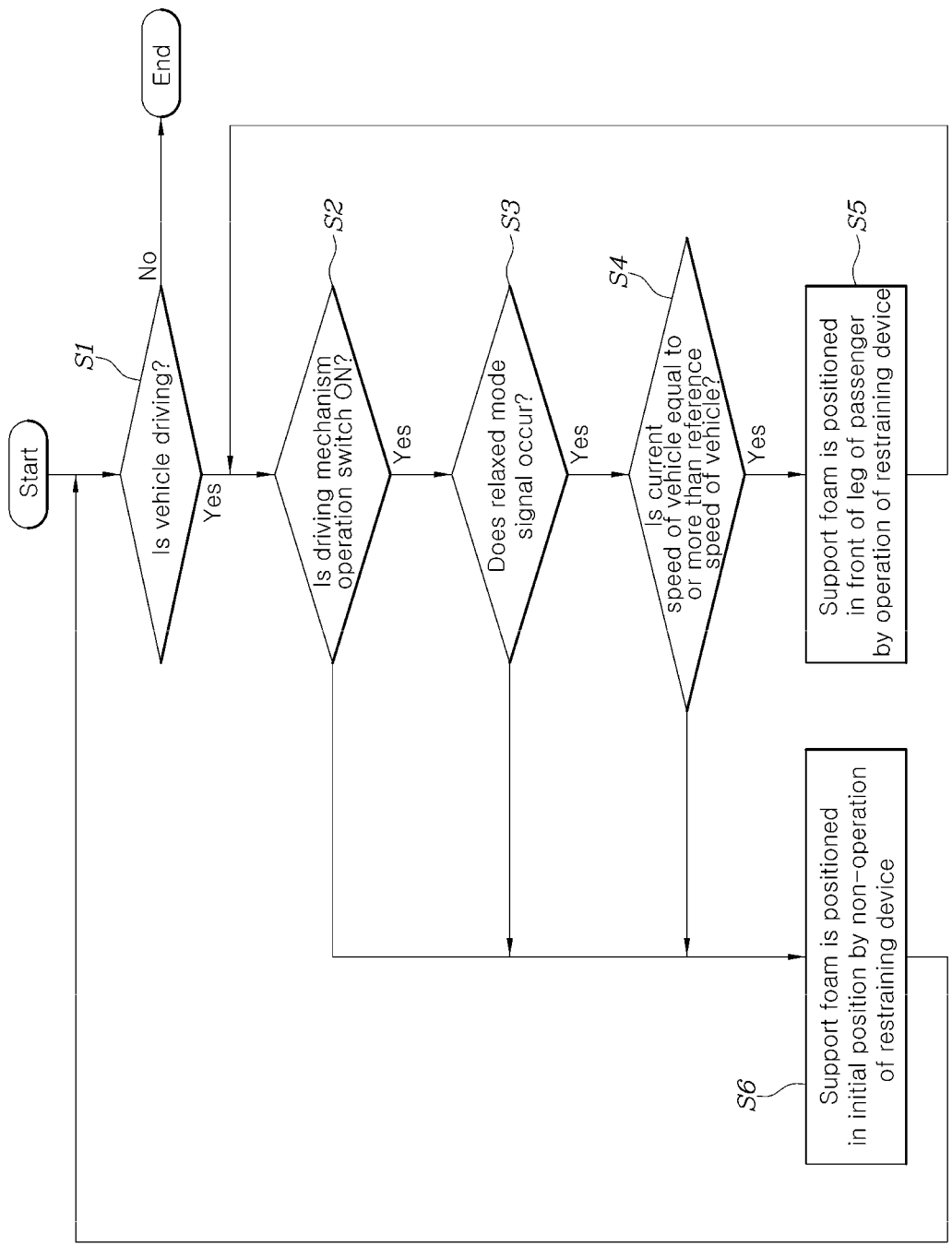

DEVICE FOR RESTRAINING PASSENGER IN RELAXED POSITION FOR VEHICLE SEAT AND METHOD FOR CONTROLLING OPERATION THEREOF

CROSS REFERENCE TO RELATED APPLICATION

The present application claims under 35 U.S.C. § 119(a) the benefit of Korean Patent Application No. 10-2021-0082640, filed on Jun. 24, 2021, the entire contents of which are incorporated by reference herein.

BACKGROUND

1. Technical Field

The present disclosure relates to a device for restraining a passenger seated in a relaxed position for a vehicle seat and a method for controlling an operation of the device, such that when the seated passenger in an autonomous vehicle enters a relaxed mode, the passenger's legs can be restrained.

2. Description of the Prior Art

Research and development efforts continue regarding autonomous vehicles, which refer to smart vehicles combined with autonomous driving technologies that allow drivers to reach destinations without requiring manual operation of steering wheels, acceleration pedals, and brakes.

If autonomous driving is widely implemented, a driver would be able to select from a manual driving mode in which he or she manually drives a vehicle, and an autonomous driving mode in which the vehicle autonomously reaches a destination without the driver's intervention.

In the autonomous driving mode, various modes can be implemented according to a seat arrangement condition, such as a relaxed mode in which seated passengers can relax and rest, and a facing mode in which passengers on first-row seats and passengers on second-row seats face each other.

In the relaxed mode, seatbacks are rotated backwards by a predetermined angle or more with regard to seat cushions. If an accident occurs in the relaxed mode, the amount of forward movement of the lower body of a passenger (the amount of forward movement of the lower body of the passenger resulting from forward slip of the seated passenger in the relaxed mode when the accident occurs) is larger than that in a normal sitting state in which a seat backs is erected, and a degree of damage to the passenger increases accordingly.

It is difficult to effectively restrain seated passengers in the relaxed mode, if an accident occurs, solely by seat belts and air bags currently used in vehicles. Therefore, a new concept of restraining devices for protecting seated passengers in relaxed positions is necessary.

The above descriptions regarding background technologies have been made only to help understanding of the background of the present disclosure, and are not to be deemed by those skilled in the art to correspond to already-known prior arts.

SUMMARY

It is an aspect of the present disclosure to provide a device for restraining a passenger seated in a relaxed position for a vehicle seat and a method for controlling an operation of the device, such that when the seated passenger in an autonomous vehicle enters a relaxed mode, and when the vehicle speed reaches a predetermined speed or higher, the passenger's legs can be restrained, thereby effectively protecting the passenger in the relaxed position if an accident occurs.

In accordance with an aspect of the present disclosure, a device for restraining a passenger in a relaxed position for a vehicle seat includes: a rod member coupled to a seat cushion and configured to have a variable length; and a support foam connected to one end of the rod member and positioned in front of a seated passenger to restrain legs of the passenger.

The rod member includes: a carriage guide coupled to the seat cushion and configured to have a rail groove formed to extend along a lengthwise direction of the seat cushion; and a carriage bar coupled to the carriage guide and configured to move along the rail groove.

The device further includes a driving mechanism configured to connect the carriage guide and the carriage bar so as to move the carriage bar when operating.

The support foam is connected to one end of the carriage bar, and the support foam is configured to restrain the legs of the seated passenger in a state where the carriage bar protrudes from the carriage guide.

The device further includes a controller configured to control operation of the driving mechanism, and the controller is configured to receive signals from a driving mechanism operation switch, a relaxed mode switch, and a vehicle speed sensor so as to control operation of the driving mechanism.

The driving mechanism operation switch is provided on one side surface of a seat cover in order to allow operation by the seated passenger.

A movable block is provided at a rear end of the carriage bar and is inserted in the rail groove so as to move along the rail groove, a support arm is provided at a front end of the carriage bar, and the support foam is coupled so as to surround the support arm.

The carriage bar further includes a support bracket configured to surround an upper surface of the carriage guide and to move in a state of being supported on the upper surface of the carriage guide when the carriage bar moves.

The driving mechanism includes: a motor fixedly coupled to a rear end of the carriage guide; a lead screw positioned in the rail groove and arranged along a lengthwise direction of the lead screw; and multiple gear members configured to connect the motor and the lead screw. A front end of the lead screw is rotatably supported at a front end of the carriage guide. A rear end of the lead screw is connected to the gear members through the movable block of the carriage bar inserted in the rail groove.

The lead screw is screw-coupled to the movable block while extending through the movable block such that the movable block moves along the lengthwise direction of the lead screw in a state of being guided in the rail groove when the lead screw rotates.

A plurality of first stopper protrusions are arranged on a front surface of the movable block along the circumferential direction thereof. A rotating plate is integrally coupled to the front end of the lead screw. A plurality of second stopper protrusions are arranged on the one surface of the rotating plate along the circumferential direction thereof. The first and second stopper protrusions are configured to be in contact with each other by the rotating plate rotating together with the lead screw when the carriage bar moves in a full stroke in a direction in which the carriage bar protrudes from the carriage guide. The carriage bar is configured to rotate in one direction by a rotation force transferred from the lead screw and the rotating plate to the carriage bar through the movable block by the contact between the first and the second stopper protrusions. The support foam, which is coupled to the carriage bar, is positioned in front of the legs of the seated passenger through rotation of the carriage bar so as to restrain the legs of the seated passenger.

An opening is formed at the front end of the carriage guide to be open upward and is configured to enable rotation of the movable block. In an initial state in which the movable block is positioned at the rear end of the carriage guide, the support foam, which is coupled to the front end of the carriage bar, is positioned to protrude upward. When the movable block moves to the front end of the carriage guide and then rotates through the opening, the support foam is configured to rotate in a state of protruding upward to be positioned in a transversal direction thereof so as to restrain the legs of the seated passenger.

When rotation of the movable block is completed through the opening, the movable block is configured to be in contact with the carriage guide so as to restrain excessive rotation thereof. Driving of the motor is terminated in accordance with increasing resistance of the motor due to the continuous rotation of the lead screw. The support foam is configured to continuously maintain a condition in which the legs of the seated passenger are restrained.

An opening is formed at the front end of the carriage guide to be open downward and is configured to enable rotation of the movable block. In an initial state in which the movable block is positioned at the rear end of the carriage guide, the support foam, which is coupled to the front end of the carriage bar, is positioned to protrude downward. When the movable block moves to the front end of the carriage guide and then rotates through the opening, the support foam is configured to rotate in a state of protruding downward to be positioned in a transversal direction thereof so as to restrain the legs of the seated passenger.

In accordance with another aspect of the present disclosure, a method for controlling operation of a device for restraining a passenger in a relaxed position for a vehicle seat includes: a first determination step of determining whether a driving mechanism operation switch is in an operation ON state in a state where a vehicle is driven; a second determination step of determining whether a relaxed mode signal occurs when the driving mechanism operation switch is in the operation ON state as a result of the determination in the first determination step; a third determination step of determining whether the current speed of a vehicle is greater than or equal to a reference speed of the vehicle when the relaxed mode signal has occurred as a result of the determination in the second determination step; and a passenger restraint step in which, when the current speed of the vehicle is greater than or equal to the reference speed of the vehicle as a result of the determination of the third determination step, a motor is driven by a controller, a carriage bar moves forward along a carriage guide and then rotates in one direction by rotation of a lead screw by driving of the motor, and a support foam coupled to the carriage bar is positioned, by the rotation of the carriage bar, in front of legs of a seated passenger so as to restrain the legs of the seated passenger.

When the driving mechanism operation switch is in an OFF state as a result of the determination in the first determination step, the motor is not driven by the controller; the carriage bar does not move in front of the carriage guide, and the support foam coupled to the carriage bar maintains an initial position in which the legs of the seated passenger are not restrained.

When the driving mechanism operation switch is the operation ON state as a result of the determination in the first determination step, and when the relaxed mode signal has not occurred as a result of the determination in the second determination step, the motor is not driven by the controller; the carriage bar does not move in front of the carriage guide, and the support foam coupled to the carriage bar maintains an initial position in which the legs of the seated passenger are not restrained.

When the driving mechanism operation switch is the operation ON state as a result of the determination in the first determination step, when a relaxed mode signal has occurred as a result of the determination in the second determination step, and when the current speed of the vehicle is equal to or less than the reference speed of the vehicle a result of the determination in the third determination step, the motor is not driven by the controller; the carriage bar does not move in front of the carriage guide, and the support foam coupled to the carriage bar maintains an initial position in which the legs of the seated passenger are not restrained.

A control logic after preforming the passenger restraint step is fed back to the first determination step, and the first determination step to the third determination step are sequentially and continuously performed; and in the process of performing the first determination step to the third determination step, when at least one condition from among a condition in which the driving mechanism operation switch is the operation ON state, a condition in which the relaxed mode signal has occurred, and a condition in which the current speed of the vehicle is greater than or equal to the reference speed of the vehicle is not satisfied, the carriage bar moves backward along the carriage guide by driving of the motor and rotation of the lead screw by the controller, and the support foam returns to an initial position in response to a release the situation in which the legs of the seated passenger are restrained.

A device for restraining a passenger in a relaxed position for a vehicle seat according to the present disclosure is advantageous in that, when a seated passenger in an autonomous vehicle enters a relaxed mode, and when the vehicle speed reaches a predetermined speed or higher, the device automatically operates such that the legs of the seated passenger can be restrained, thereby effectively protecting the passenger in the relaxed position if an accident occurs.

BRIEF DESCRIPTION OF THE DRAWINGS

The above and other aspects, features, and advantages of the present disclosure will be more apparent from the following detailed description taken in conjunction with the accompanying drawings, in which.

FIG. 17 is a flowchart illustrating a method for controlling operation of a restraining device according to the present disclosure.

Figure 1:
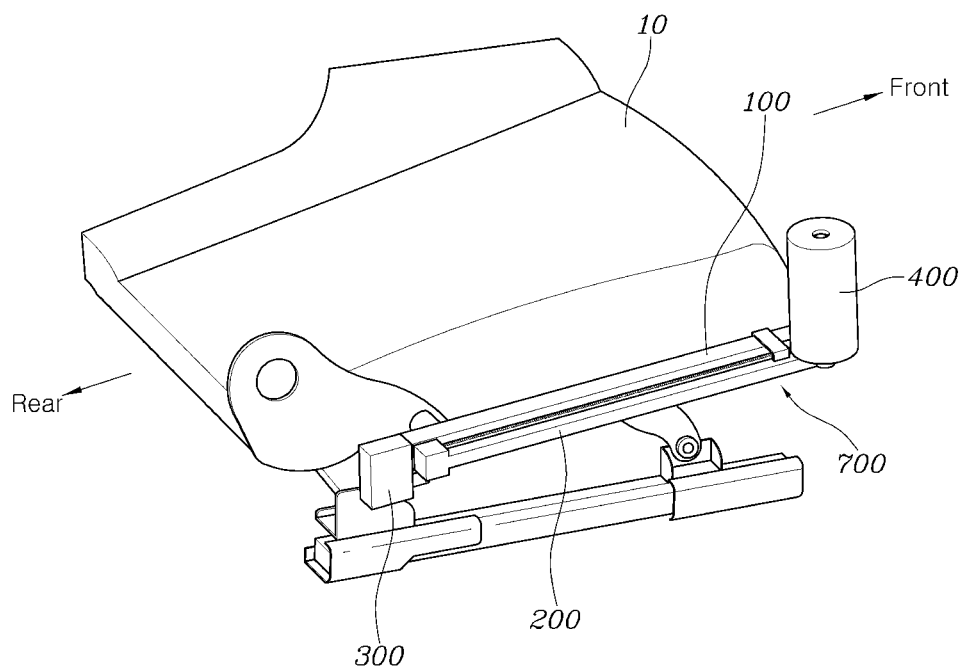
FIG. 1 is a view showing an initial state before operation of a device for restraining a passenger in a relaxed position for a vehicle seat according to the present disclosure.

DETAILED DESCRIPTION OF THE
EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Such terms as "a first" and/or "a second" may be used to described various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e. "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

A control unit (controller) according to exemplary embodiments of the present disclosure may be implemented by a non-volatile memory (not shown) which is configured to store data pertaining to an algorithm configured to control operations of various vehicle components or software instructions for reproducing the algorithm, and a processor (not shown) which is configured to perform the operations as described below by using the data stored in the corresponding memory. Here, the memory and the processor may be implemented as individual chips. Alternatively, the memory and the processor may be implemented as an integrated single chip. The processor may be in the form of one or more processors.

Hereinafter, a device for restraining a passenger in a relaxed position for a vehicle seat according to a preferable embodiment of the present disclosure is described with reference to the accompanying drawings.

FIG. 1 to FIG. 11 are views of a restraining device for a passenger seated in a relaxed position according to the present disclosure, and illustrate an embodiment wherein a support foam is configured to vertically erect upward in a case of an initial state before a restraining device operates, and the support foam, which has been vertically erected upward, is configured to rotate and then be positioned in a transversal direction when operation of the restraining device has completed.

Figure 2:
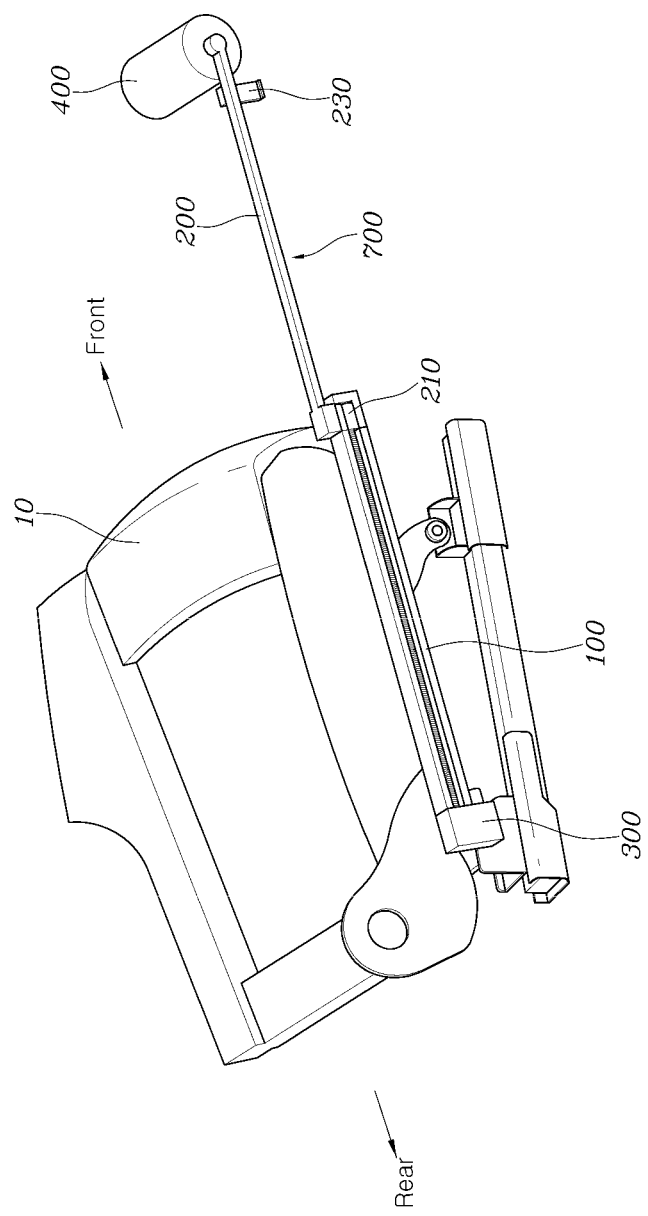
FIG. 2 is a view showing a restraining device after operation according to the present disclosure.
Figure 3:
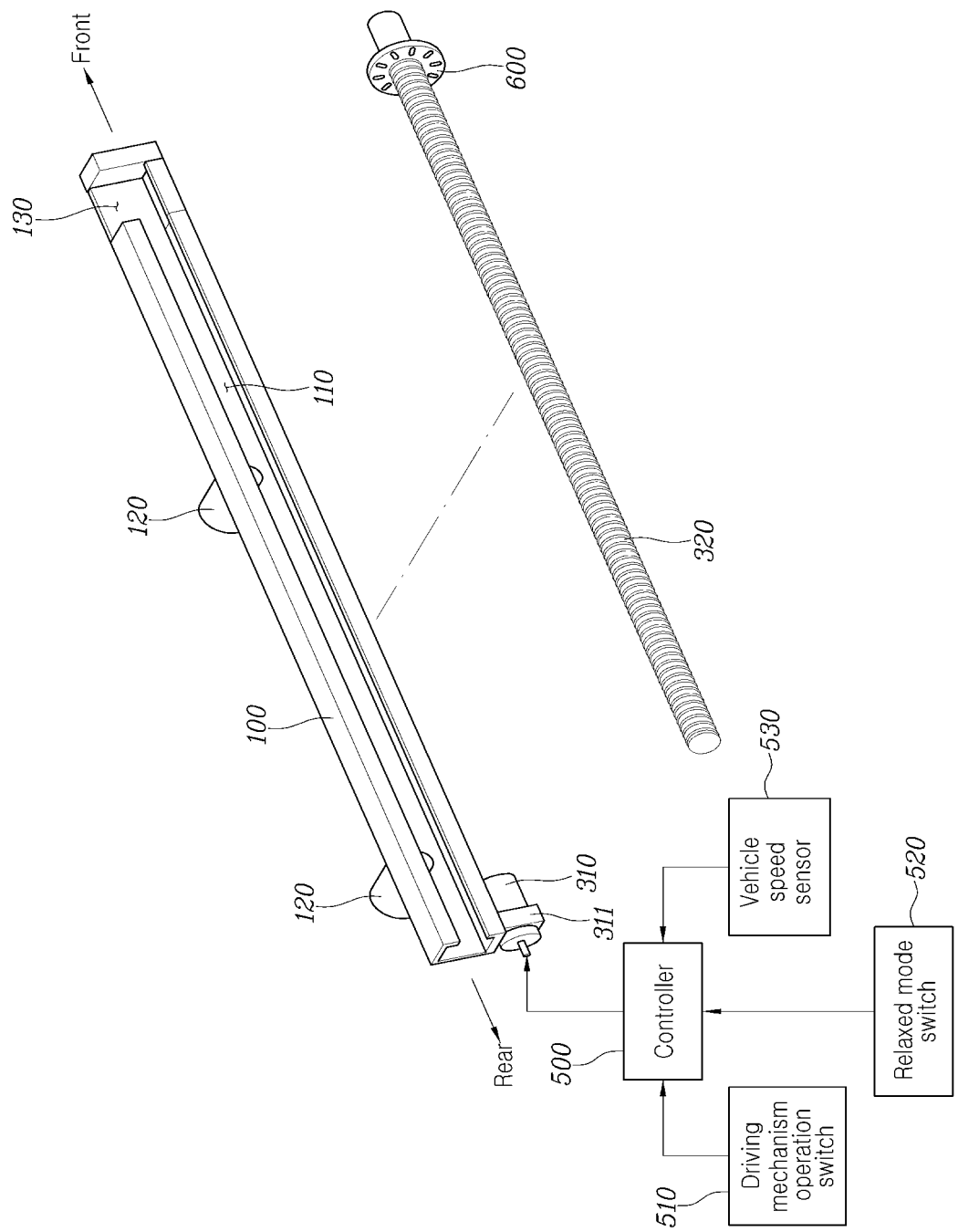
FIG. 3 to FIG. 11 are views illustrating constituent elements of a restraining device according to the present disclosure.
Figure 4:
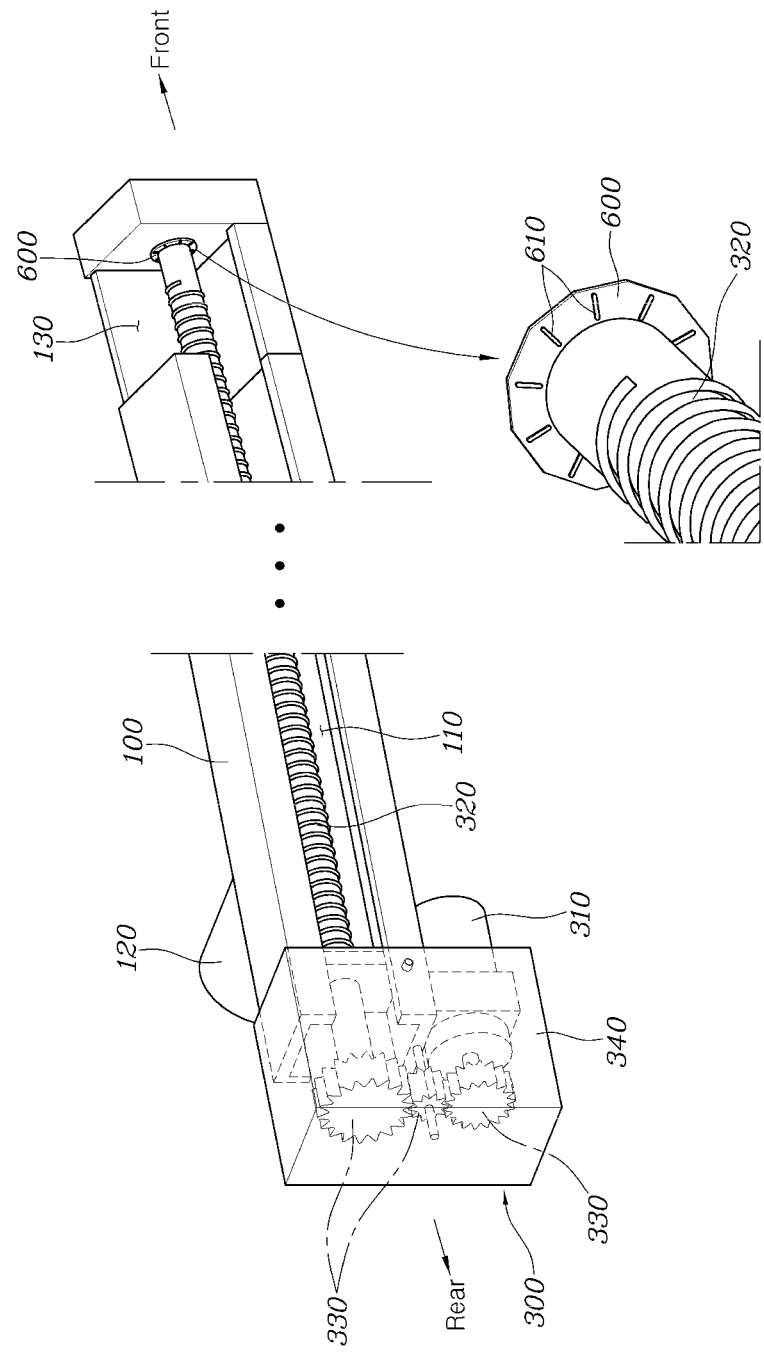
Figure 5:
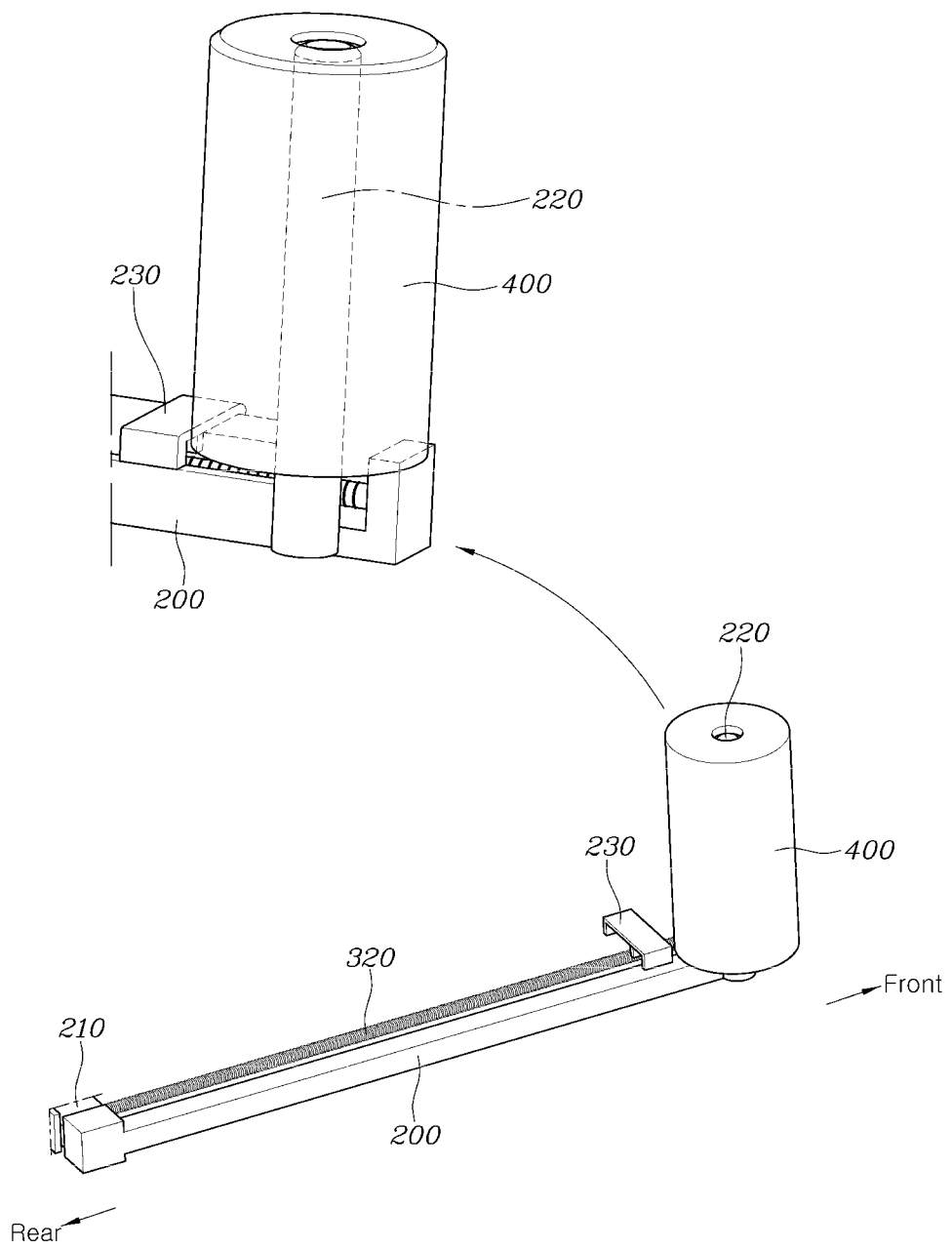
Figure 6:
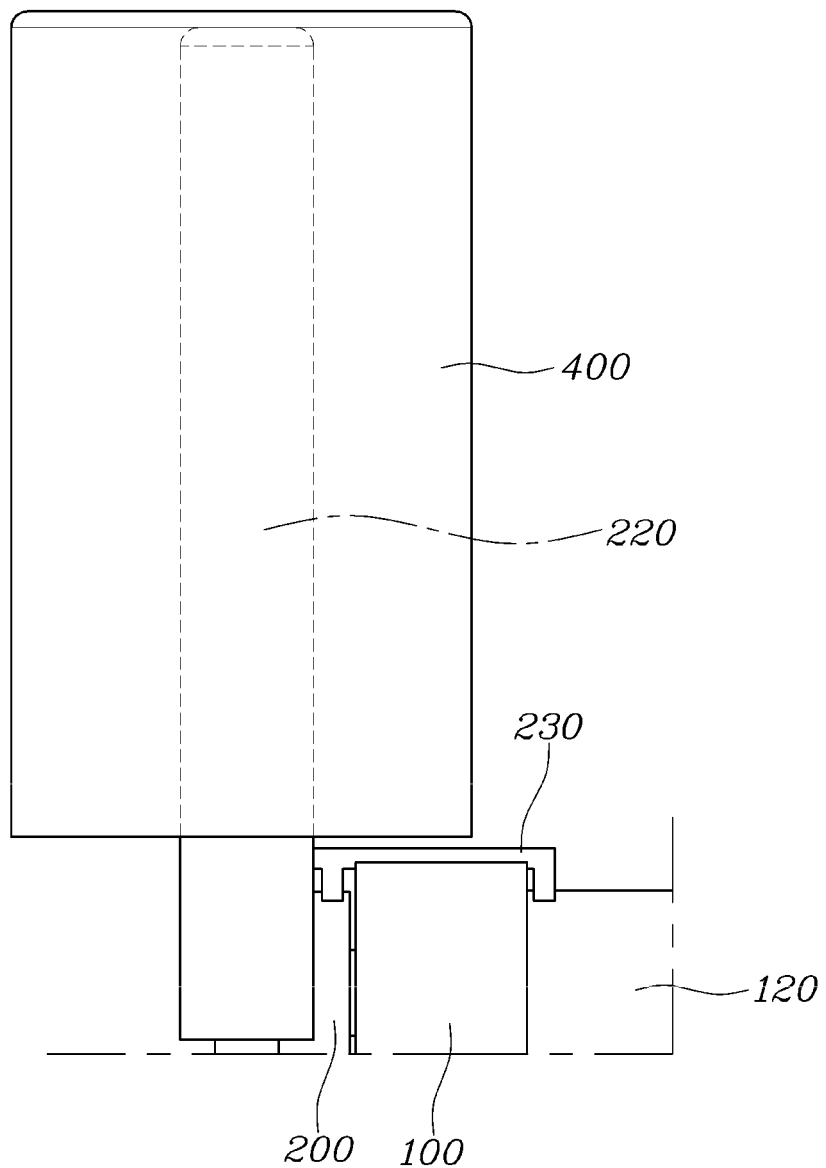
Figure 7:
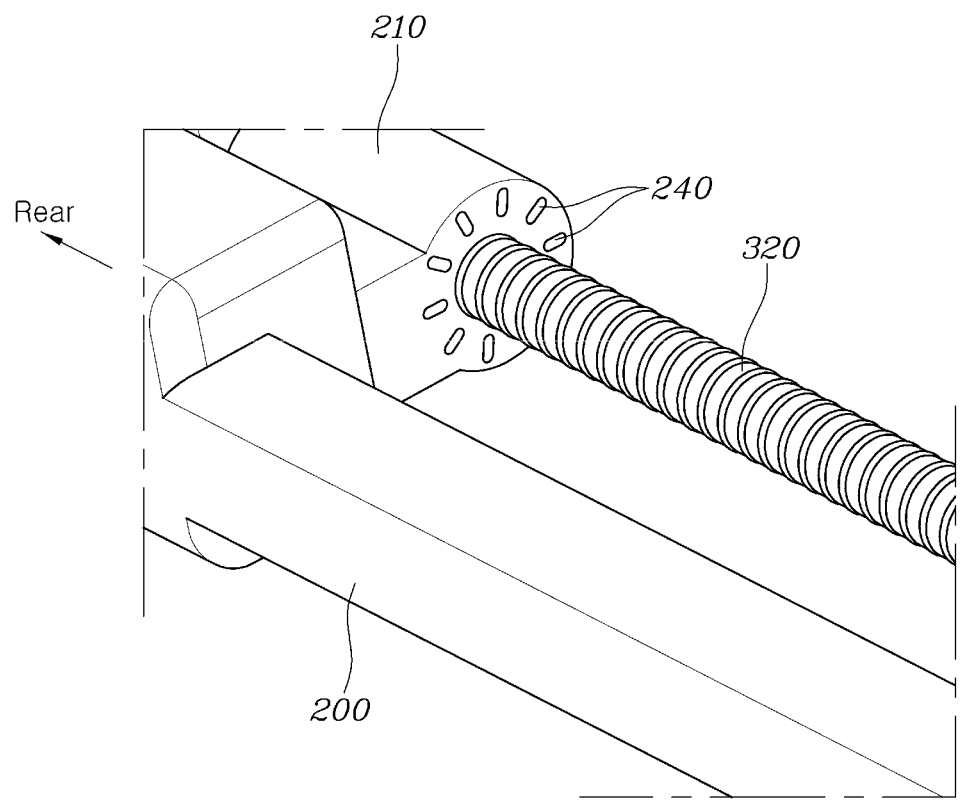
Figure 8:
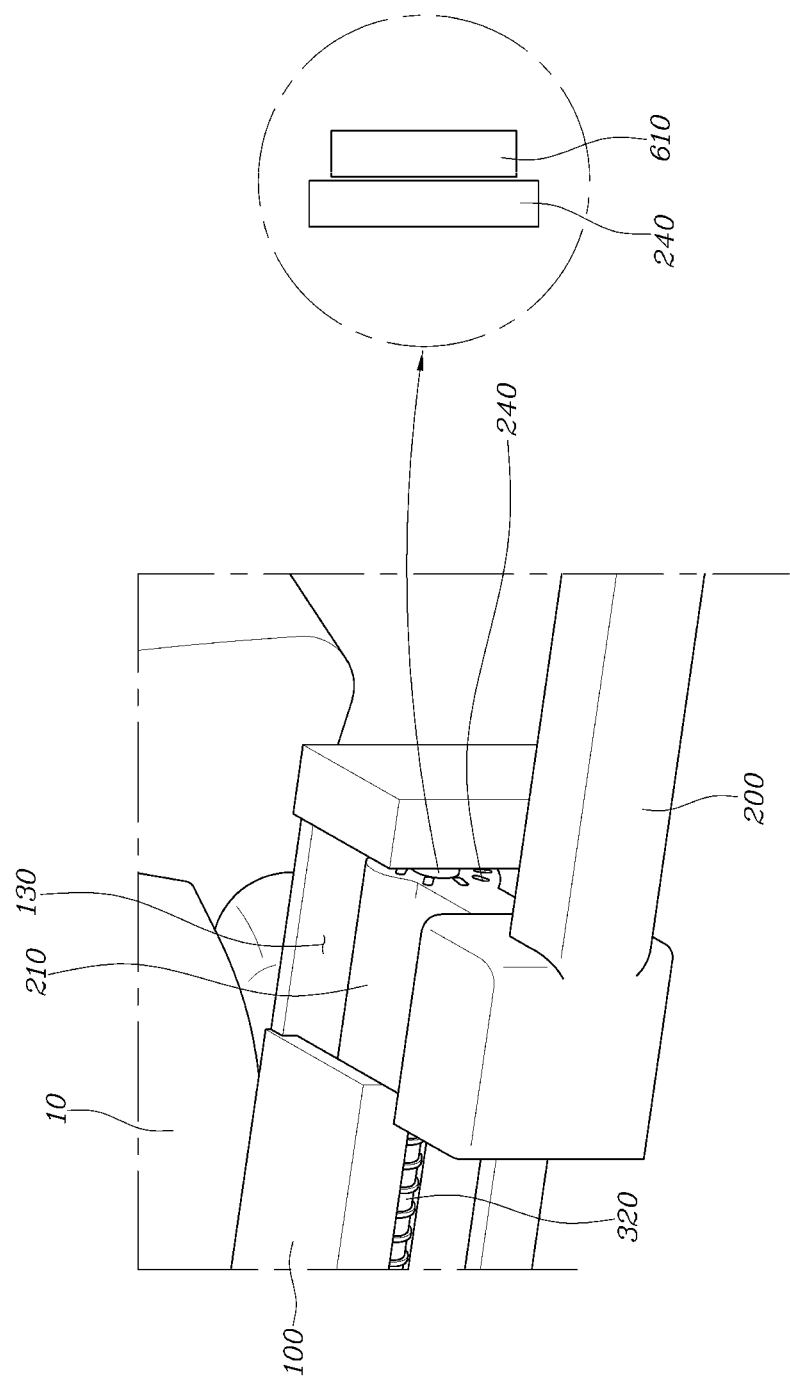
Figure 9:
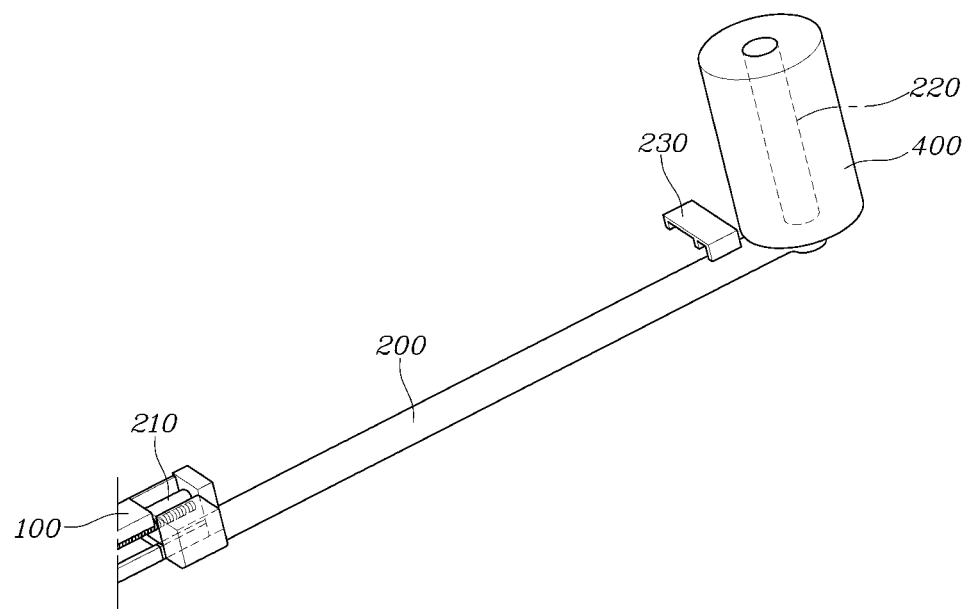
Figure 10:
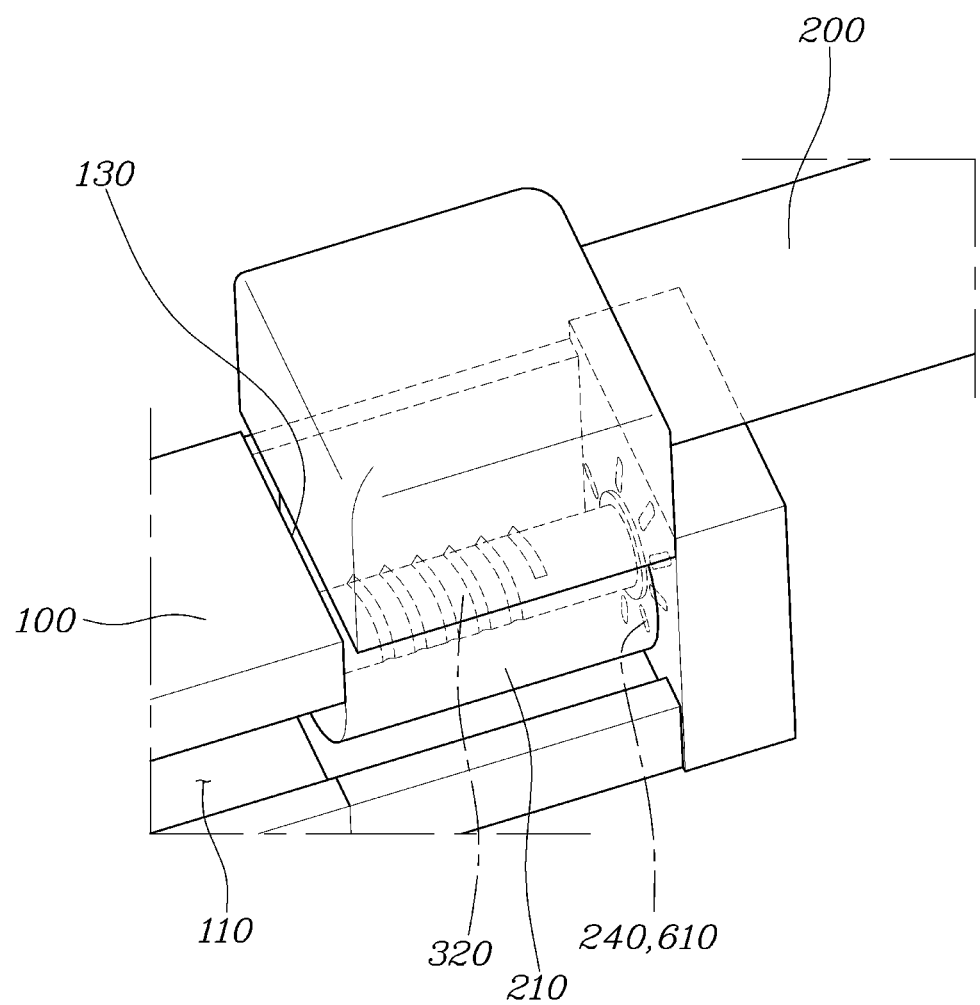
Figure 11:
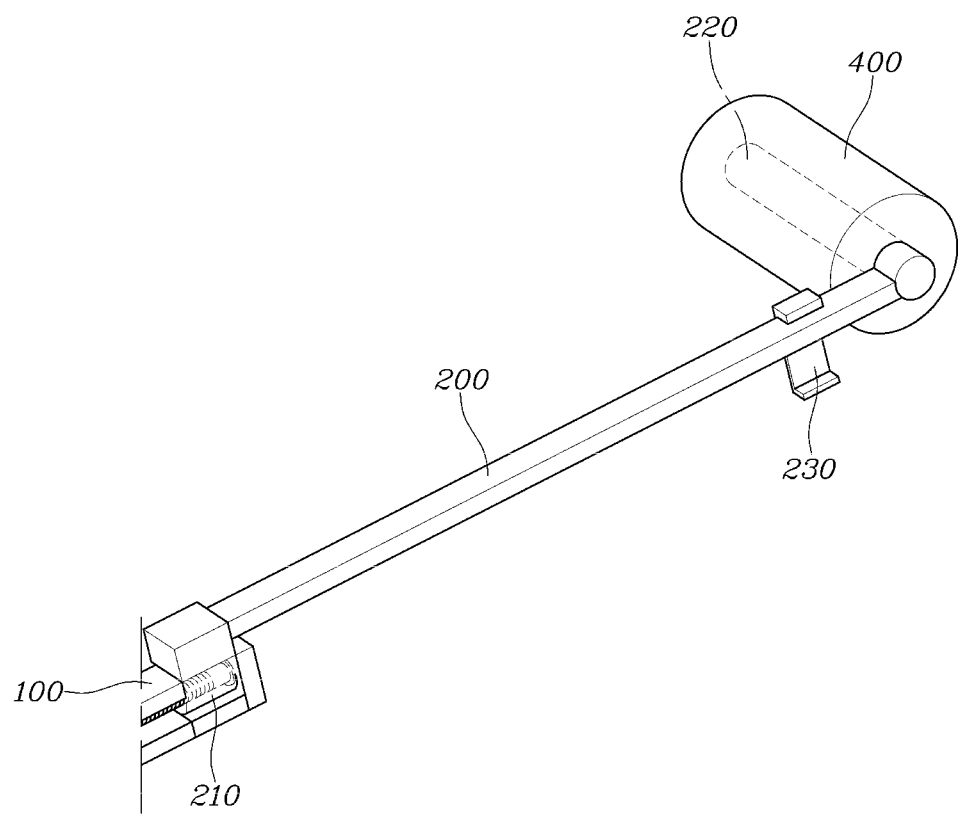

FIG. 1 is a view showing an initial state before operation of a restraining device according to the present disclosure, and FIG. 2 is a view showing a state after operation of a restraining device.

A restraining device for a passenger in a relaxed position according to the present disclosure includes: a rod member 700 coupled to a seat cushion 10 and configured to have a variable length; and a support foam 400 coupled to one end of the rod member 700 and positioned in front of a seated passenger 1 to restrain the leg of the passenger 1.

The rod member 700 includes a carriage guide 100 coupled to the seat cushion 10 and configured to have a rail groove 110 which is formed to extend along a lengthwise direction of the seat cushion 10, and a carriage bar 200 coupled to the carriage guide 100 and configured to move along the rail groove 110.

An embodiment of the present disclosure further includes a driving mechanism 300 which is configured to connect the carriage guide 100 and the carriage bar 200 to move the carriage bar 200 when operating.

The support foam 400 is connected to one end of the carriage bar 200, and is positioned in front of the leg 2 of the seated passenger 1 to restrain the leg of the seated passenger when the carriage bar 200 moves, in a full stroke, in a direction (the front) in which the carriage bar 200 protrudes from the carriage guide 100.

The carriage guide 100 is fixedly installed on one side surface of the seat cushion 10 so as to extend frontward and backward by the use of multiple mounting brackets 120.

In addition, the restraining device according to the present disclosure further includes a controller 500 which is configured to control operation of the driving mechanism 300, and the controller 500 is configured to receive signals from a driving mechanism operation switch 510, a relaxed mode switch 520, and a vehicle speed sensor 530 so as to control operation of the driving mechanism 300.

The driving mechanism operation switch 510 may be provided on one side surface of a seat cover 20 in order to allow easy and comfort operation by the seated passenger 1, and may be a switch which allows an on or off operation by operation of a passenger.

An autonomous vehicle is provided with a driving mode switch which can select an autonomous driving mode in vehicle driving and is provided with a relaxed mode switch 520 which enable a passenger to select a relaxed mode in a state of autonomous driving.

When a passenger operates the relaxed mode switch 520, a signal by operating the relaxed mode switch is transferred to a controller 500, and the controller 500 controls driving of the driving mechanism 300 by using the signal from the relaxed mode switch 520.

The signal from the relaxed mode switch 520 may be used as a determination for entering the relaxed mode, but, as necessary, the information on a reclining angle of a seat back may be used as well. A reclining angle of a seat back may be defined as an angle in which a seat back is tilted backward, an angle which is formed by a seat back and a seat cushion according to the frontward-backward rotation of the seat back, or the like.

A movable block 210 is provided at a rear end of the carriage bar 200 and is inserted in the rail groove 110 so as to move along the rail groove 110, and a support arm 220 is provided at a front end of the carriage bar 200. The support arm 220 is configured to surround the support foam 400 and thus to form a structure to which the support foam is coupled.

The support foam 400 is a component in contact with the leg 2 of the passenger 1. Therefore, it is preferable to form the support foam as a material having a cushion feeling in order to buffer an impact.

The carriage bar 200 further includes a support bracket 230 which is configured to surround an upper surface of the carriage guide 100 and to move in a state of being supported on the upper surface of the carriage guide 100 when the carriage bar 200 moves.

The support bracket 230 is configured to function to increase a supporting force of the carriage bar 200 when the restraining device of the present disclosure does not operate, and the support arm 220 is configured to function to support the leg 2 of the passenger 1 after the restraining device operates. In addition, the support foam 400 is mounted on the support arm 220 and is configured to function to disperse the weight through a cushion when the leg 2 of the passenger 1 is in contact therewith after the restraining device operates.

The driving mechanism 300 includes a motor 310 which is fixedly coupled to the rear end of the carriage guide 100, a lead screw 320 which is positioned in the rail groove 110 and arranged along a lengthwise direction of the lead screw 320, multiple gear members 330 which are configured to connect the motor 310 and the lead screw 320, and a gear cover 340 which is fixed to the carriage guide 100 and configured to cover the gear members 330.

The motor 310 is fixedly installed at the rear end of the carriage guide 100 by the motor bracket 311.

A front end of the lead screw 320 is supported to a front end of the carriage guide 100 in a rotatable structure, and a rear end of the lead screw 320 is connected to the gear members 330 through the movable block 210 of the carriage bar 200 which is inserted in the rail groove 110.

The rear end of the lead screw 320 is screw-coupled to the movable block 210 while extending through the movable block 210 of the carriage bar 200, and thus the movable block 210 moves along the lengthwise direction of the lead screw 320 in a state of being guided the rail groove 110 when the lead screw 320 rotates. Therefore, the carriage bar 200 moves in the front-back direction along a lengthwise direction of the carriage guide 100 together with the movable block 210.

The gear members 330 may include a driving gear coupled to the motor 310, a driven gear coupled to the lead screw 320, and an idle gear for connecting the driving gear and the driven gear.

A plurality of first stopper protrusions 240 are arranged on a front surface of the movable block 210 of the carriage bar 200 along the circumferential direction thereof, a rotating plate 600 is integrally coupled to the front end of the lead screw 320, and a plurality of second stopper protrusions 610 are be arranged on one surface of the rotating plate 600 along the circumferential direction thereof.

The first stopper protrusions 240 and the second stopper protrusions 610 are formed to have a structure of facing each other.

Accordingly, when the carriage bar 200 moves, in a full stroke, in a direction (the front) in which the carriage bar protrudes from the carriage guide 100, the first stopper protrusions 240 formed on the movable block 210 move to the front end of the carriage guide 100 to be positioned between the second stopper protrusions 610, and the first and the second stopper protrusions 240 and 610 are in contact with each other by the rotating plate 600 which rotates together with the lead screw 320 by power of the motor 310. Therefore, the rotation force of the lead screw 320 and the rotating plate 600 is transferred to the carriage bar 200 through the movable block 210 by the contact between the first and the second stopper protrusions 240 and 610 so that the carriage bar 200 rotates in one direction. Accordingly, through the rotation of the carriage bar 200, the support foam 400, which is coupled to the carriage bar 200, is positioned in front of the leg 2 of the seated passenger 1 to restrain the leg 2 of the seated passenger 1 (see FIGS. 12A and 12B).

An opening 130, which is configured to enable rotation of the movable block 210, is formed at the front end of the carriage guide 100 to be open upward.

Accordingly, in an initial state (a state before operation of the restraining device) in which the movable block 210 is positioned at the rear end of the carriage guide 100, the support foam 400, which is coupled to the front end of the carriage bar 200, is positioned to protrude upward (see FIG. 1), and when the movable block 210 rotates through the opening 130 after moving to the front end of the carriage guide 100, the support foam 400 rotates, in a state of protruding upward, to be positioned in the transversal direction thereof so at to restrain the leg 2 of the seated passenger 1 (see FIG. 1 and FIG. 2).

In addition, when the rotation of the movable block 210 is completed through the opening 130, the movable block 210 is configured to be in contact with the carriage guide 100 so as to restrain the excessive rotation thereof, and driving of the motor 310 is terminated in accordance with increasing resistance of the motor 310 due to the continuous rotation of the lead screw 320. Therefore, the support foam 400 can continuously maintain a condition in which the leg 2 of the seated passenger 1 is restrained.

Another embodiment of a restraining device according to the present disclosure, illustrated in FIG. 13 to FIG. 16, has a structure in which the opening 130 that is configured to enable rotation of the movable block 210 is formed at the front end of the carriage guide 100 to be open downward.

Figure 13:
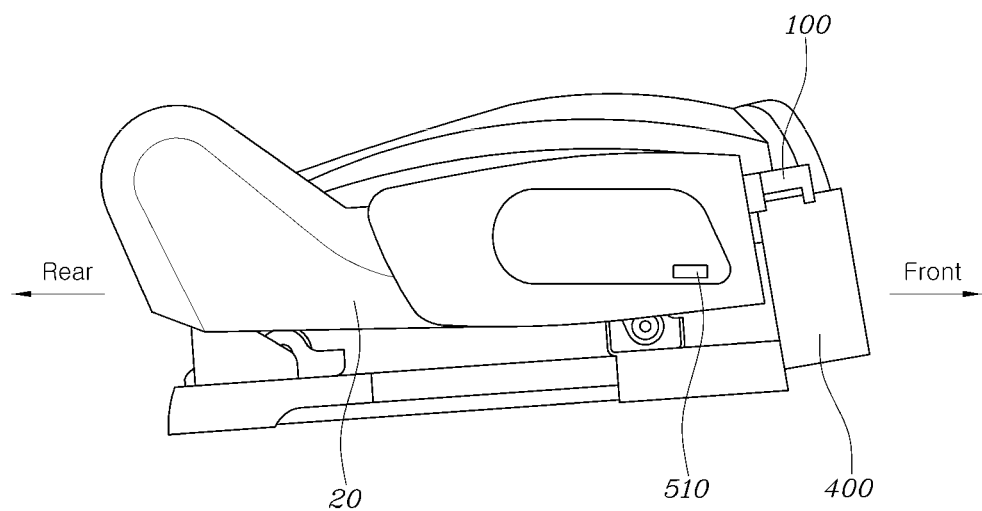
FIG. 13 to FIG. 16 are views illustrating another embodiment of a restraining device according to the present disclosure.
Figure 14:
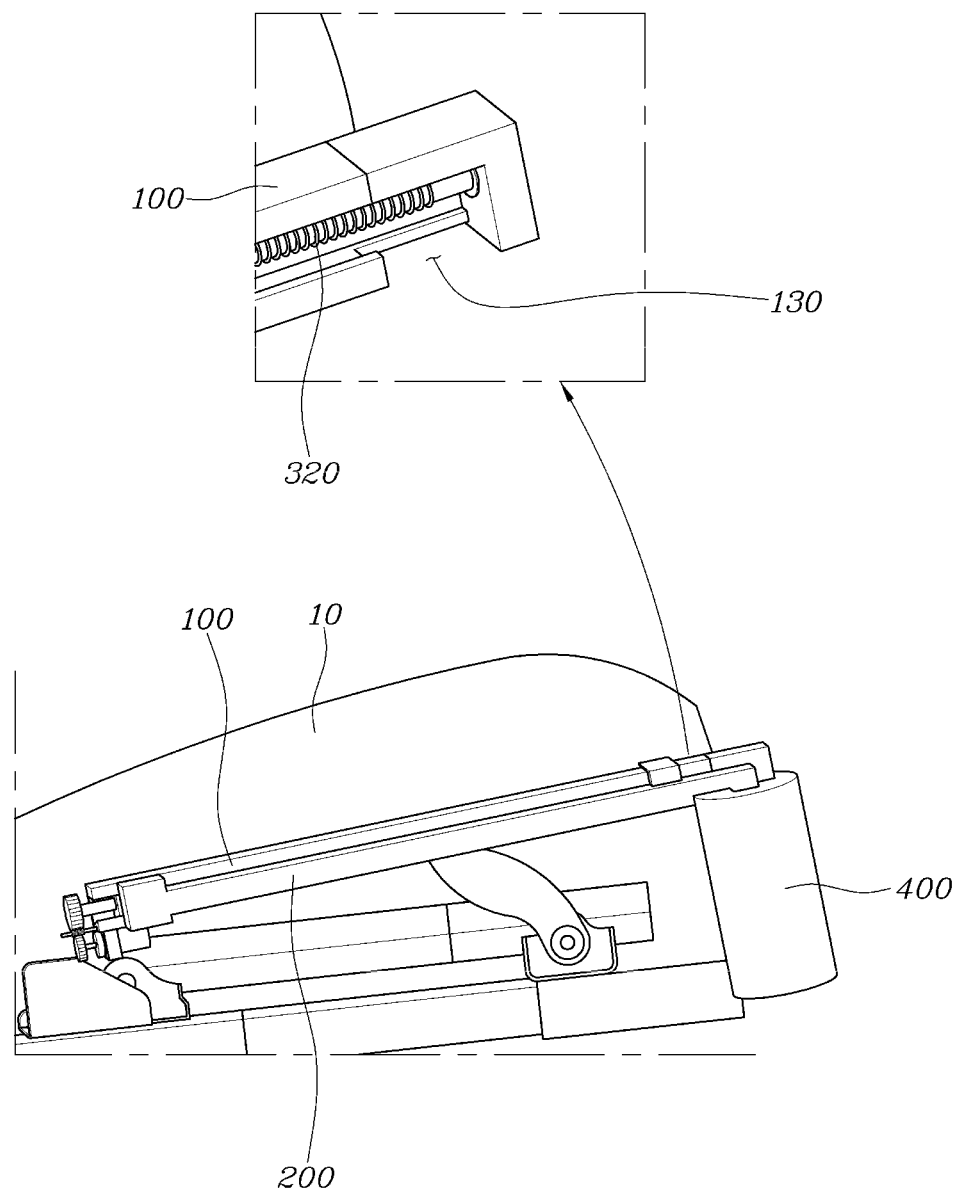

Accordingly, in the initial state (the state before operation of the restraining device) in which the movable block 210 is positioned at the rear end of the carriage guide 100, the support foam 400, which is coupled to the front end of the carriage bar 200, is positioned to protrude downward (see FIG. 13 and FIG. 14). Therefore, it is possible to maximally hide a portion in which the support foam 400 protrudes upward to improve the beauty of the appearance thereof.

Figure 15:
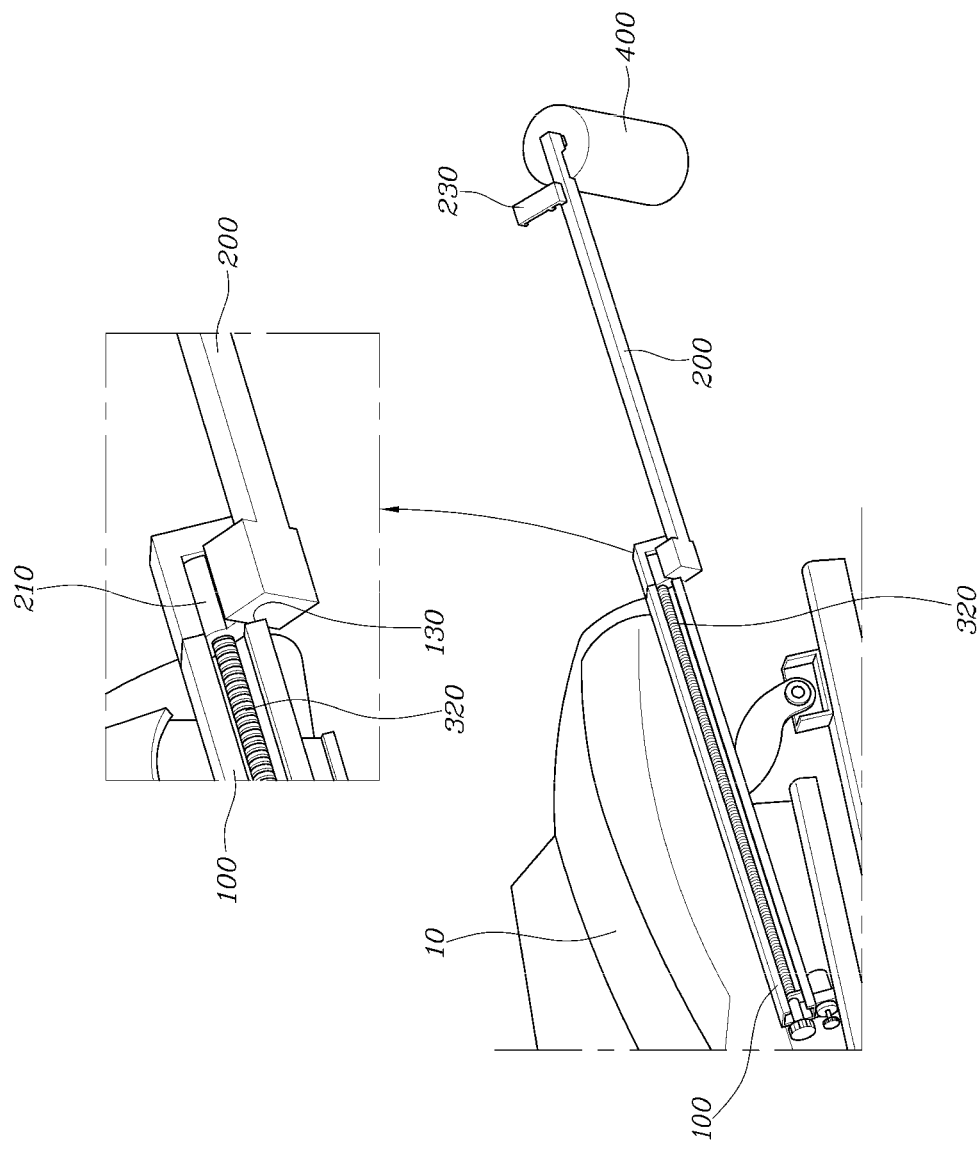
Figure 16:
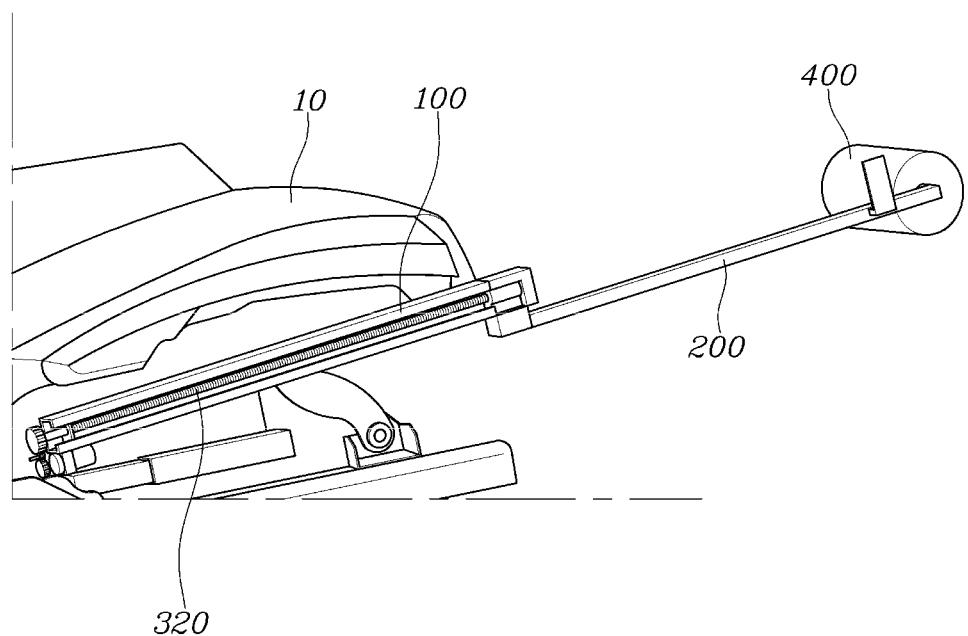

In addition, when the movable block 210 moves to the front end of the carriage guide 100 and then rotates through the opening 130, the support foam 400 rotates, in a state of protruding downward, to be positioned in a transversal direction so as to restrain the leg 2 of the seated passenger 1 (see FIG. 15, and FIG. 16).

A method for controlling operation of a device for restraining a passenger in a relaxed position for a vehicle seat according to the present disclosure is explained with reference to FIG. 17.

When a vehicle enters a driving state (step S1) after starting ON of the vehicle, the controller 500 performs a first determination step of determining whether the driving mechanism operation switch 510 is an operation ON state (step S2).

When the driving mechanism operation switch 510 is determined as the operation ON state as a result of the determination in the step S2, a second determination step of determining whether a relaxed mode signal caused by the relaxed mode switch 520 occurs is performed (step S3).

When the state is determined as a state in which the relaxed mode signal has occurred as a result of the determination in the step S3, a third determination step of determining whether the current speed of a vehicle is greater than or equal to a reference speed of the vehicle is performed (step S4).

A reference speed of a vehicle is a minimum speed that a passenger is subject to injuries due to an accident during driving, and for example, may be defined as 26 kilometers per hour (kph) but is not limited thereby.

When the current speed of the vehicle is determined as greater than or equal to the reference speed of the vehicle as a result of the determination in the step S4, a passenger restraint step in which the motor 310 is driven by the controller 500, the carriage bar 200 moves forward along the carriage guide 100 and then rotates in one direction by rotation of the lead screw 320 by driving of the motor 310, and the support foam 400, which is coupled to the carriage bar 200, is positioned, by rotation of the carriage bar 200, in front of the leg 2 of a seated passenger 1 to restrain the leg 2 of the seated passenger 1 is performed (step S5).

Figure 12A:
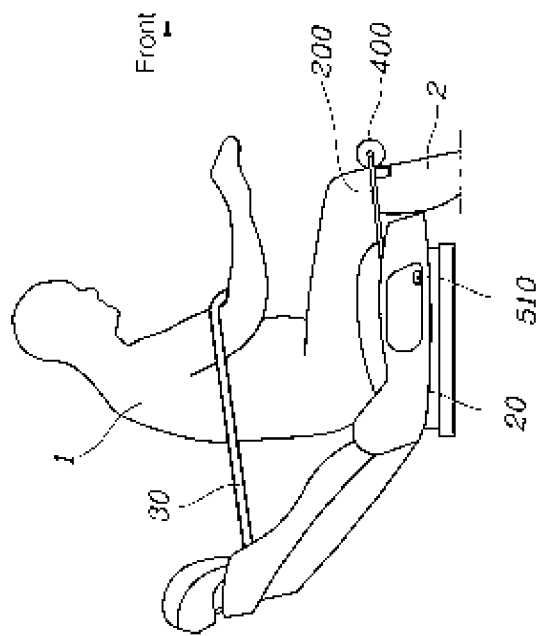
FIG. 12A and FIG. 12B are views illustrating motion, before and after an accident, of a passenger in a relaxed position caused by a restraining device according to present disclosure.

The state after operation of the restraining device according to the present disclosure corresponds to the passenger restraint step and is the same as that of FIG. 12A, and at this time, the passenger 1 is in a state of wearing a seat belt 30.

Figure 12B:
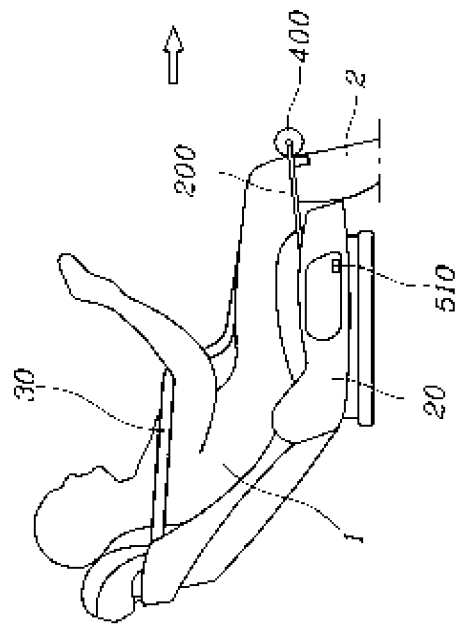

As illustrated in FIG. 12A, when, according to the leg of the passenger, which is in a relaxed position, being supported by the support foam 400, an accident occurs in a state in which the leg 2 of the passenger 1 is restrained, as illustrated in FIG. 12B, a forward rotation of the upper body of the passenger 1 can be induced due to the restraint of the leg 2. However, since the seat belt 30 is worn on the upper body of the passenger 1, the passenger may be subjected to high restraint force by the seat belt 30. Accordingly, it can prevent a phenomenon that the passenger is released from the seat belt 30 due to sliding of the lower body of the passenger 1. Therefore, consequently, there may be an advantage that the passenger 1 positioned in the relaxed position is effectively protected.

Meanwhile, by a control logic according to the present disclosure, when the driving mechanism operation switch 510 is determined as an OFF state as a result of the determination in the first determination step (step S2), the motor 310 is not driven by the controller 500, the carriage bar 200 does not move in front of the carriage guide 100, and accordingly the support foam 400, which is coupled to the carriage bar 200, continuously maintains the initial position of not restraining the leg 2 of the seated passenger 1 (step S6).

In addition, by the control logic according to the present disclosure, even if the driving mechanism operation switch 510 is determined as the operation ON state through the determination in the first determination step (step S2), when the state is determined as a state in which the relaxed mode signal, through the determination in the second determination step (step S3), is not occurred, also, the support foam 400 continuously maintains the initial position of not restraining the leg 2 of the seated passenger 1 by the controller 500 (step S6).

In addition, by the control logic according to the present disclosure, even if the driving mechanism operation switch 510 is determined as the operation ON state through the determination in the first determination step (step S2) and it is determined that the relaxed mode signal, through the determination in the second determination step, occurs (step S3), when it is determined that the current speed of the vehicle is equal to or less than the reference speed of the vehicle through the determination in the third determination step (step S4), also, the support foam 400 continuously maintains the initial position of not restraining the leg 2 of the seated passenger 1 by the controller 500 (step S6).

In addition, after preforming the passenger restraint step (step S5), the control logic according to the present disclosure is fed back to the first determination step (step S2), and the first determination step (step S2) to the third determination step (step S4) are thus sequentially and continuously performed. Furthermore, in the process of performing the first determination step to the third determination step, when at least one condition among the condition in which the driving mechanism operation switch 510 is the operation ON state, the condition in which the relaxed mode signal has occurred, and the condition in which the current speed of the vehicle is greater than or equal to the reference speed of the vehicle is not satisfied, the carriage bar 200 moves backward along the carriage guide 100 by driving of the motor 310 and rotation of lead screw 320 by the controller 500, and the support foam 400 thus returns to the initial position before the operation thereof while releasing the state of restraining the leg 2 of the seated passenger 1.

As described above, the vehicle seat restraining device for a passenger in a relaxed position according to the present disclosure is configured to automatically operate so as to enable the leg 2 of the seated passenger 1 to be restrained when the seated passenger 1 in an autonomous vehicle enters into the relaxed mode and the vehicle speed is greater than or equal to a predetermined speed. Therefore, according to the present disclosure, the passenger 1 which is positioned in the relaxed position can be effectively protected when an accident occurs.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A device for restraining a passenger in a relaxed position for a vehicle seat, the device comprising:
    a rod member coupled to a seat cushion and configured to have a length of the rod member variable with respect to the seat cushion in a front and rear direction of the seat cushion; and
    a support foam connected to one end of the rod member and positioned in front of a seated passenger to restrain legs of the seated passenger.

2. The device of claim 1, wherein the rod member comprises:
    a carriage guide coupled to the seat cushion and configured to have a rail groove formed to extend along a lengthwise direction of the seat cushion; and
    a carriage bar coupled to the carriage guide and configured to move along the rail groove.

3. The device of claim 2, further comprising a driving mechanism configured to connect the carriage guide and the carriage bar so as to move the carriage bar when operating.

4. The device of claim 2, wherein the support foam is connected to one end of the carriage bar, and
    the support foam is configured to restrain the legs of the seated passenger in a state where the carriage bar protrudes from the carriage guide.

5. The device of claim 3, further comprising a controller configured to control operation of the driving mechanism, wherein the controller is configured to receive signals from a driving mechanism operation switch, a relaxed mode switch, and a vehicle speed sensor so as to control operation of the driving mechanism.

6. The device of claim 5, wherein the driving mechanism operation switch is provided on one side surface of a seat cover in order to allow operation by the seated passenger.

7. The device of claim 3, wherein a movable block is provided at a rear end of the carriage bar and is inserted in the rail groove so as to move along the rail groove, a support arm is provided at a front end of the carriage bar, and the support foam is coupled so as to surround the support arm.

8. The device of claim 2, wherein the carriage bar further comprises a support bracket configured to surround an upper surface of the carriage guide and to move in a state of being supported on the upper surface of the carriage guide when the carriage bar moves.

9. The device of claim 7, wherein the driving mechanism comprises:
    a motor fixedly coupled to a rear end of the carriage guide;
    a lead screw positioned in the rail groove and arranged along a lengthwise direction of the lead screw; and
    multiple gear members configured to connect the motor and the lead screw, wherein
    a front end of the lead screw is rotatably supported at a front end of the carriage guide, and
    a rear end of the lead screw is connected to the gear members through the movable block of the carriage bar inserted in the rail groove.

10. The device of claim 9, wherein the lead screw is screw-coupled to the movable block while extending through the movable block such that the movable block moves along the lengthwise direction of the lead screw in a state of being guided in the rail groove when the lead screw rotates.

11. The device of claim 9, wherein a plurality of first stopper protrusions are arranged on a front surface of the movable block along the circumferential direction thereof;
    a rotating plate is integrally coupled to the front end of the lead screw;
    a plurality of second stopper protrusions are arranged on the one surface of the rotating plate along the circumferential direction thereof;
    the first and second stopper protrusions are configured to be in contact with each other by the rotating plate rotating together with the lead screw when the carriage bar moves in a full stroke in a direction in which the carriage bar protrudes from the carriage guide;
    the carriage bar is configured to rotate in one direction by a rotation force transferred from the lead screw and the rotating plate to the carriage bar through the movable block by the contact between the first and the second stopper protrusions; and
    the support foam, which is coupled to the carriage bar, is positioned in front of the legs of the seated passenger through rotation of the carriage bar so as to restrain the legs of the seated passenger.

12. The device of claim 9, wherein an opening is formed at the front end of the carriage guide to be open upward and is configured to enable rotation of the movable block;
    in an initial state in which the movable block is positioned at the rear end of the carriage guide, the support foam, which is coupled to the front end of the carriage bar, is positioned to protrude upward; and
    when the movable block moves to the front end of the carriage guide and then rotates through the opening, the support foam is configured to rotate in a state of protruding upward to be positioned in a transversal direction thereof so as to restrain the legs of the seated passenger.

13. The device of claim 12, wherein when rotation of the movable block is completed through the opening, the movable block is configured to be in contact with the carriage guide so as to restrain excessive rotation thereof;
   driving of the motor is terminated in accordance with increasing resistance of the motor due to the continuous rotation of the lead screw; and
   the support foam is configured to continuously maintain a condition in which the legs of the seated passenger are restrained.

14. The device of claim 9, wherein an opening is formed at the front end of the carriage guide to be open downward and is configured to enable rotation of the movable block;
   in an initial state in which the movable block is positioned at the rear end of the carriage guide, the support foam, which is coupled to the front end of the carriage bar, is positioned to protrude downward; and
   when the movable block moves to the front end of the carriage guide and then rotates through the opening, the support foam is configured to rotate in a state of protruding downward to be positioned in a transversal direction thereof so as to restrain the legs of the seated passenger.

15. A method for controlling operation of a device for restraining a passenger in a relaxed position for a vehicle seat, the method comprises:
   a first determination step of determining whether a driving mechanism operation switch is in an operation ON state in a state where a vehicle is driven;
   a second determination step of determining whether a relaxed mode signal occurs when the driving mechanism operation switch is in the operation ON state as a result of the determination in the first determination step;
   a third determination step of determining whether a current speed of the vehicle is greater than or equal to a reference speed of the vehicle when the relaxed mode signal has occurred as a result of the determination in the second determination step; and
   a passenger restraint step in which, when the current speed of the vehicle is greater than or equal to the reference speed of the vehicle as a result of the determination of the third determination step, a motor is driven by a controller, a carriage bar moves forward along a carriage guide and then rotates in one direction by rotation of a lead screw by driving of the motor, and a support foam coupled to the carriage bar is positioned, by the rotation of the carriage bar, in front of legs of a seated passenger so as to restrain the legs of the seated passenger.

16. The method of claim 15, wherein when the driving mechanism operation switch is in an OFF state as a result of the determination in the first determination step, the motor is not driven by the controller; the carriage bar does not move in front of the carriage guide, and the support foam coupled to the carriage bar maintains an initial position in which the legs of the seated passenger are not restrained.

17. The method of claim 15, wherein when the driving mechanism operation switch is the operation ON state as a result of the determination in the first determination step, and when the relaxed mode signal has not occurred as a result of the determination in the second determination step, the motor is not driven by the controller; the carriage bar does not move in front of the carriage guide, and the support foam coupled to the carriage bar maintains an initial position in which the legs of the seated passenger are not restrained.

18. The method of claim 15, wherein when the driving mechanism operation switch is the operation ON state as a result of the determination in the first determination step, when a relaxed mode signal has occurred as a result of the determination in the second determination step, and when the current speed of the vehicle is equal to or less than the reference speed of the vehicle a result of the determination in the third determination step, the motor is not driven by the controller; the carriage bar does not move in front of the carriage guide, and the support foam coupled to the carriage bar maintains an initial position in which the legs of the seated passenger are not restrained.

19. The method of claim 15, wherein a control logic after preforming the passenger restraint step is fed back to the first determination step, and the first determination step to the third determination step are sequentially and continuously performed; and
   in the process of performing the first determination step to the third determination step, when at least one condition from among a condition in which the driving mechanism operation switch is the operation ON state, a condition in which the relaxed mode signal has occurred, and a condition in which the current speed of the vehicle is greater than or equal to the reference speed of the vehicle is not satisfied, the carriage bar moves backward along the carriage guide by driving of the motor and rotation of the lead screw by the controller, and the support foam returns to an initial position in response to a release the situation in which the legs of the seated passenger are restrained.

* * * * *